(12) United States Patent
Ahssini et al.

(10) Patent No.: US 11,720,358 B2
(45) Date of Patent: *Aug. 8, 2023

(54) EMBEDDED SYSTEM

(71) Applicant: Proton World International N.V., Diegem (BE)

(72) Inventors: Youssef Ahssini, Vilvoorde (BE); Guy Restiau, Ramillies (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 63 days.

This patent is subject to a terminal disclaimer.

(21) Appl. No.: 17/133,309

(22) Filed: Dec. 23, 2020

(65) Prior Publication Data

US 2021/0200542 A1 Jul. 1, 2021

(30) Foreign Application Priority Data

Dec. 31, 2019 (FR) ...................................... 1915752

(51) Int. Cl.

| | |
|---|---|
| *G06F 16/23* | (2019.01) |
| *G06F 21/64* | (2013.01) |
| *G06F 9/30* | (2018.01) |
| *G06Q 20/10* | (2012.01) |
| *G06F 8/61* | (2018.01) |
| *G06F 9/445* | (2018.01) |

(52) U.S. Cl.
CPC ............ *G06F 9/30043* (2013.01); *G06F 8/61* (2013.01); *G06F 9/44505* (2013.01); *G06Q 20/108* (2013.01)

(58) Field of Classification Search
None
See application file for complete search history.

(56) References Cited

U.S. PATENT DOCUMENTS

| | | | | |
|---|---|---|---|---|
| 5,740,351 | A | * | 4/1998 | Kasten ................ G06F 11/3644 |
| | | | | 714/E11.21 |
| 8,117,587 | B1 | * | 2/2012 | Testardi .............. G06F 11/3664 |
| | | | | 717/100 |
| 9,110,751 | B2 | * | 8/2015 | Fisher ....................... G06F 8/41 |
| 11,582,101 | B2 | * | 2/2023 | Cartes ................. G06F 11/1433 |
| 2002/0103996 | A1 | | 8/2002 | LeVasseur et al. |
| 2002/0147972 | A1 | | 10/2002 | Olmeda et al. |

(Continued)

FOREIGN PATENT DOCUMENTS

| | | |
|---|---|---|
| EP | 1 021 801 B1 | 11/2004 |
| FR | 2 667 171 A1 | 3/1992 |

(Continued)

OTHER PUBLICATIONS

In DOS, what is an AUTOEXEC.BAT file?, Jan. 18, 2018, AAML (Year: 2018).

*Primary Examiner* — Hyun Nam
(74) *Attorney, Agent, or Firm* — Seed Intellectual Property Law Group LLP

(57) ABSTRACT

Embedded systems and methods of starting an embedded system are disclosed. A method of starting an embedded system includes executing first instructions, distinct from instructions of an operating system of the embedded system. The method further includes causing the storage of at least one application into a non-volatile memory in response to executing the first instructions.

14 Claims, 4 Drawing Sheets

(56) References Cited

U.S. PATENT DOCUMENTS

| | | | |
|---|---|---|---|
| 2003/0009305 A1 | 1/2003 | Eden | |
| 2003/0236986 A1* | 12/2003 | Cronce | G06F 21/14 |
| | | | 717/118 |
| 2003/0236989 A1 | 12/2003 | Condemine | |
| 2007/0277169 A1* | 11/2007 | Rao | G06F 8/65 |
| | | | 717/173 |
| 2009/0065325 A1 | 3/2009 | Potonniee | |
| 2009/0287571 A1 | 11/2009 | Fujioka | |
| 2010/0122197 A1 | 5/2010 | Fujioka | |
| 2010/0333075 A1* | 12/2010 | Asai | G06F 9/45508 |
| | | | 717/139 |
| 2012/0185833 A1* | 7/2012 | Oh | G06F 9/4552 |
| | | | 717/148 |
| 2016/0105411 A1* | 4/2016 | Vallieres | H04L 9/32 |
| | | | 726/3 |
| 2016/0314055 A1* | 10/2016 | Bagchi | H03M 7/60 |
| 2020/0310825 A1 | 10/2020 | Zhan et al. | |
| 2020/0394049 A1 | 12/2020 | Eder et al. | |
| 2021/0200542 A1* | 7/2021 | Ahssini | G06F 8/61 |
| 2021/0200543 A1* | 7/2021 | Ahssini | G06F 9/44557 |
| 2021/0303284 A1 | 9/2021 | Rodgers et al. | |
| 2022/0068106 A1* | 3/2022 | Fregia | H04L 67/12 |
| 2023/0083894 A1* | 3/2023 | Duggal | G06F 8/316 |

FOREIGN PATENT DOCUMENTS

| | | |
|---|---|---|
| FR | 2 757 970 A1 | 7/1998 |
| WO | 95/16246 A1 | 6/1995 |

* cited by examiner

EMBEDDED SYSTEM

BACKGROUND

Technical Field

The present disclosure generally concerns electronic systems and, in particular embedded electronic systems. The present disclosure more particular concerns embedded electronic systems capable of implementing at least one application.

Description of the Related Art

Embedded electronic systems, or embedded systems, are autonomous systems generally specialized in one or a plurality of specific tasks. An embedded system is generally implemented by an operating system (OS).

More and more embedded systems are capable of implementing a plurality of specific tasks. For this purpose, their operating system is capable of implementing a plurality of applications.

It would be desirable to be able to at least partly improve certain aspects of known embedded systems having their operating system capable of implementing one or a plurality of applications.

BRIEF SUMMARY

Various embodiments of the present disclosure provide more reliable embedded systems which overcome various drawbacks of the related art.

In one or more embodiments, the present disclosure provides more reliable embedded systems having their operating system capable of implementing one or a plurality of applications.

In one or more embodiments, the present disclosure provides embedded systems having the data (controls and data) of their different applications more efficiently stored in a memory.

An embodiment overcomes all or part of the disadvantages of known embedded systems.

An embodiment provides a solution more particularly adapted to a system having its operating system capable of implementing a plurality of applications.

An embodiment provides a method of starting an embedded system, wherein first instructions, distinct from instructions of an operating system of the embedded system, are executed to cause the storage of at least one application into a non-volatile memory.

According to an embodiment, the first instructions are stored in a non-volatile memory area.

According to an embodiment, second instructions of a plurality of applications are stored in said area.

According to an embodiment, said first instructions are or execute instructions of personalization and/or of configuration of the application(s).

According to an embodiment, the application(s) are capable of generating the addresses at which data are stored in said memory.

An embodiment provides an embedded system comprising an area of storage of first instructions, distinct from instructions of an operating system, into which second instructions of at least one application are stored, the first instructions being intended to cause the storage of said at least one application into a non-volatile memory at the starting of the embedded system.

According to an embodiment, at least two applications are implemented by the operating system.

According to an embodiment, said first instructions are or execute instructions of personalization and/or of configuration of the application(s).

According to an embodiment, the applications are capable of generating the addresses at which they store data into said memory.

According to an embodiment, at least one application is a bank payment or transport application.

An embodiment provides a chip card capable of implementing the described method.

An embodiment provides a chip card comprising a system such as described.

An embodiment provides a method of reading and/or writing data or instructions of at least one application in a non-volatile memory of an embedded system, wherein the data or instructions transit through a memory area and are interpreted by a program distinct from an operating system of the embedded system.

According to an embodiment, said area is a volatile memory area.

According to an embodiment, said area is a non-volatile memory area.

According to an embodiment, said at least one application is implemented by the operating system.

According to an embodiment, instructions are transferred from one application to another via said area.

According to an embodiment, the application(s) are capable of storing data into the memory.

According to an embodiment, the application(s) are capable of generating the addresses at which they store data into said memory.

An embodiment provides an embedded system, capable of implementing at least one application stored in a non-volatile memory, comprising a memory area and a program, distinct from an operating system, data or instructions of said at least one application transiting through said area to be stored in said memory.

According to an embodiment, said area is a volatile memory area.

According to an embodiment, said area is a non-volatile memory area.

According to an embodiment, the system implements at least two applications.

According to an embodiment, data transit from one application to another via said memory area.

According to an embodiment, the applications are capable of generating the addresses at which they store data into said memory.

According to an embodiment, at least one application is a bank payment or transport application.

An embodiment provides a chip card capable of implementing the described method.

An embodiment provides a chip card comprising a system such as described.

BRIEF DESCRIPTION OF THE SEVERAL VIEWS OF THE DRAWINGS

The foregoing and other features and advantages of the present disclosure will be discussed in detail in the following non-limiting description of specific embodiments and implementation modes in connection with the accompanying drawing.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The term "operating system" designates a set of programs or software enabling to operate an embedded system. It is the highest level of the programs and software implemented by the embedded system. The term "application" designates a program or software capable of being implemented by an operating system. It is a program of software with a level lower than the level of the operating system.

Figure 1:
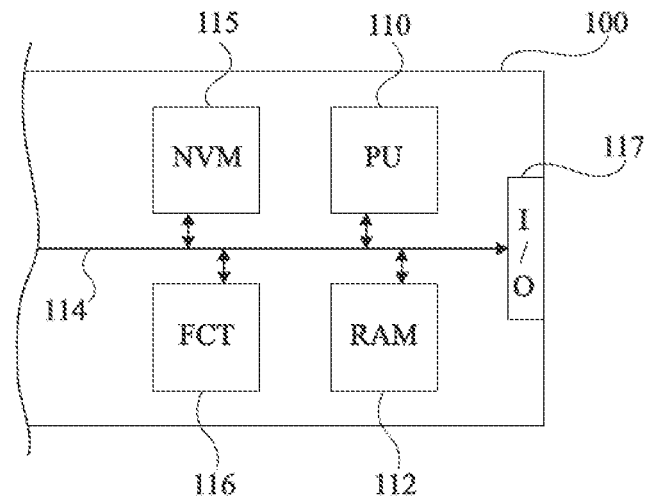
FIG. 1 very schematically shows in the form of blocks an embodiment of an electronic circuit of the type to which the described embodiments and implementation modes apply.

FIG. 1 very schematically shows, in the form of blocks, an embodiment of an electronic circuit or system 100 of the type to which the described embodiments apply.

Electronic circuit 100 comprises:

one or a plurality of digital processing units 110 (PU), among which at least one microprocessor;

one or a plurality of memories of volatile (RAM) 112 and/or non-volatile (NVM) 115 data and program storage;

one or a plurality of data, address, and/or control buses 114 between the different elements internal to circuit 100;

one or a plurality of input/output interfaces 117, (I/O) of wired or wireless communication with the outside of circuit 100; and various other circuits according to the application, symbolized in FIG. 1 by blocks 116 (FCT).

The operation of microprocessor 110 is ruled by an operating system which operates, among others, non-volatile memory areas 115.

Circuit 100 is for example integrated in a microcircuit card (IC card) or a chip card (smartcard), with or without contact.

Figure 2:
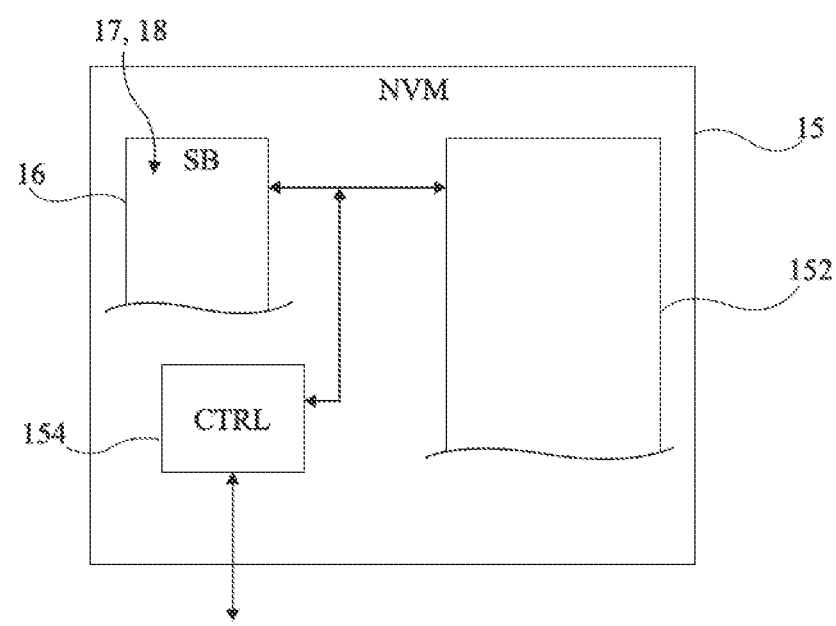
FIG. 2 very schematically shows in the form of blocks another embodiment of an electronic circuit of the type to which the described embodiments apply.

FIG. 2 very schematically shows in the form of blocks another embodiment of an electronic circuit of the type to which the described embodiments apply.

The circuit of FIG. 2 very schematically shows an example of architecture of a non-volatile memory 15 (NVM).

Memory 15 comprises, at least functionally:

one or a plurality of areas 152 for storing instructions (programs) or application data to be implemented by an operating system executed by the microprocessor or processing unit associated with the memory;

an area 16 (SB) of storage of specific instructions corresponding to instructions to be executed at the starting or initialization of the circuit or to switch from one application to another; and a memory controller 154 (CTRL) forming the interface between the inside and the outside of memory 15.

Area 16 is intended to contain at least one program (script) 18 of interpretation or of conversion of application installation or configuration instructions and/or data. The instructions and/or data may be stored in area 16 or, as a variation, be stored in volatile memory 112 or in non-volatile memory 15. Area 16 is for example a dedicated area of the non-volatile memory plane having area(s) 152 provided therein, or structurally a region distinct from memory 15, for example, a register. In some embodiments, functionally, area 16 contains both application data and a program for interpreting the data for their transfer to memory 15.

Area(s) 152 are intended to store applications of the system, that is, instructions and data associated with applications to be implemented. These are, for example, in the context of a chip card, payment applications (bank applications) or transport applications.

Memory 15 is integrated in (is in a chip common with) a circuit also containing at least one processing unit, in one or more embodiments. The memory then forms part of circuit 100 (FIG. 1) and forms an embedded non-volatile memory.

Memory 15 may as a variation be an independent electronic circuit intended to be assembled on an electronic card to be operated by a different microprocessor.

According to the described embodiments, a mechanism or program 18 embedded in the memory, more particularly stored in area 16, is provided at the level of the system integrating memory 15 (or 115, FIG. 1) and at least one processing unit. This results in the storage, into area 16, of executable interpretation instructions 18 distinct from the operating system and from the applications executed by the circuit. According to an embodiment, area or block 16 contains controls 17 linked to the applications as well as a program 18 for interpreting the instructions. Interpreter 18 is intended to be executed by the operating system to interpret instructions 17. According to another embodiment, area 16 only contains a program (script) 18 for interpreting instructions 17 contained in the volatile memory, for example loaded from the outside of the system or stored in the non-volatile memory. According to another embodiment, block 16 forms an interpreter 18 of instructions, capable of executing instructions 17 of configuration of applications contained in the memory area storing the interpreter. The execution of such instructions is then triggered by the operating system.

Figure 3:
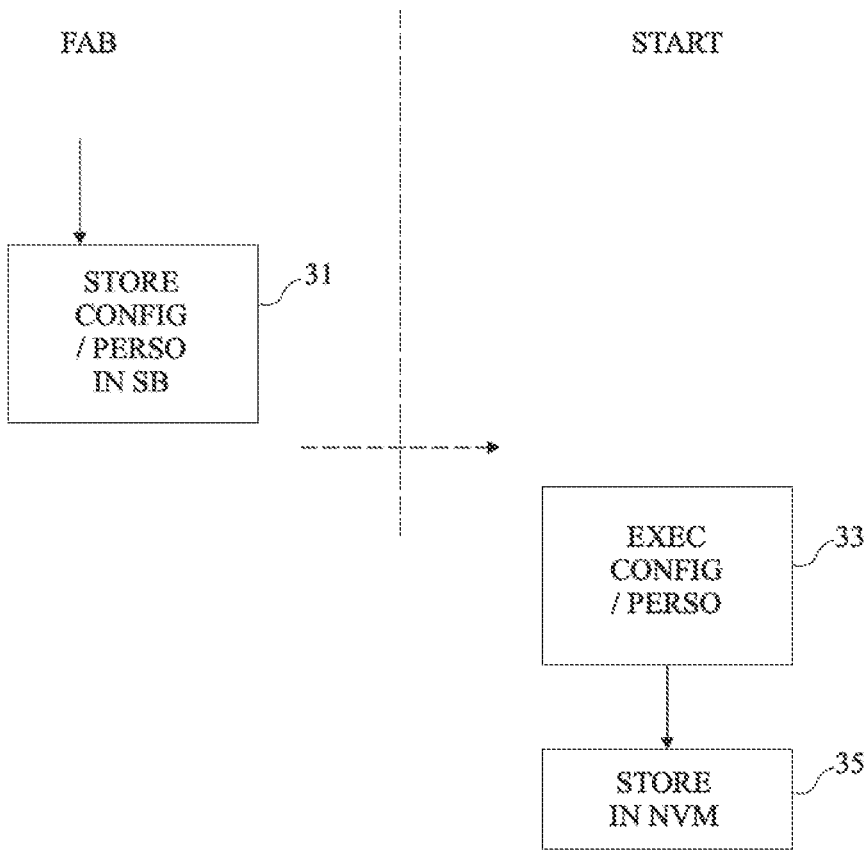
FIG. 3 very schematically shows in the form of blocks an embodiment of a method of managing a memory circuit such as illustrated in FIG. 2.

FIG. 3 very schematically shows in the form of blocks an implementation mode of a method of managing a memory circuit such as illustrated in FIG. 2.

According to this embodiment, instruction interpreter 18 is programmed on manufacturing of the circuit, or more precisely, at the end of the manufacturing, in a so-called pre-personalization phase.

Such a programming amounts to storing (block 31, STORE CONFIG/PERSO IN SB), into area 16 and at the end of the manufacturing (FAB), instructions 17 of configuration or of personalization of applications for which the embedded system is intended, as well as an interpreter 18.

Once the circuit has been manufactured and pre-personalized according to the client for which it is intended, that is, having its area 16 containing an application configuration and/or personalization program (script), the latter is delivered to the client. It is not the final user, but the entity operating the applications, for example, the bank or transport application.

At the first starting (START) of the product, the operating system causes the execution (block 33, EXEC CONFIG/PERSO), by the interpreter program 18 contained in area 16, of the configuration or personalization instructions 17 contained, for example, in this area. This results in a storage (block 35, STORE IN NVM), into area 152 (FIG. 2) of non-volatile memory 15, of the instructions and data of the application(s) for their use by the operating system.

The system is then ready to operate with the applications stored in non-volatile memory 15.

Figure 4:
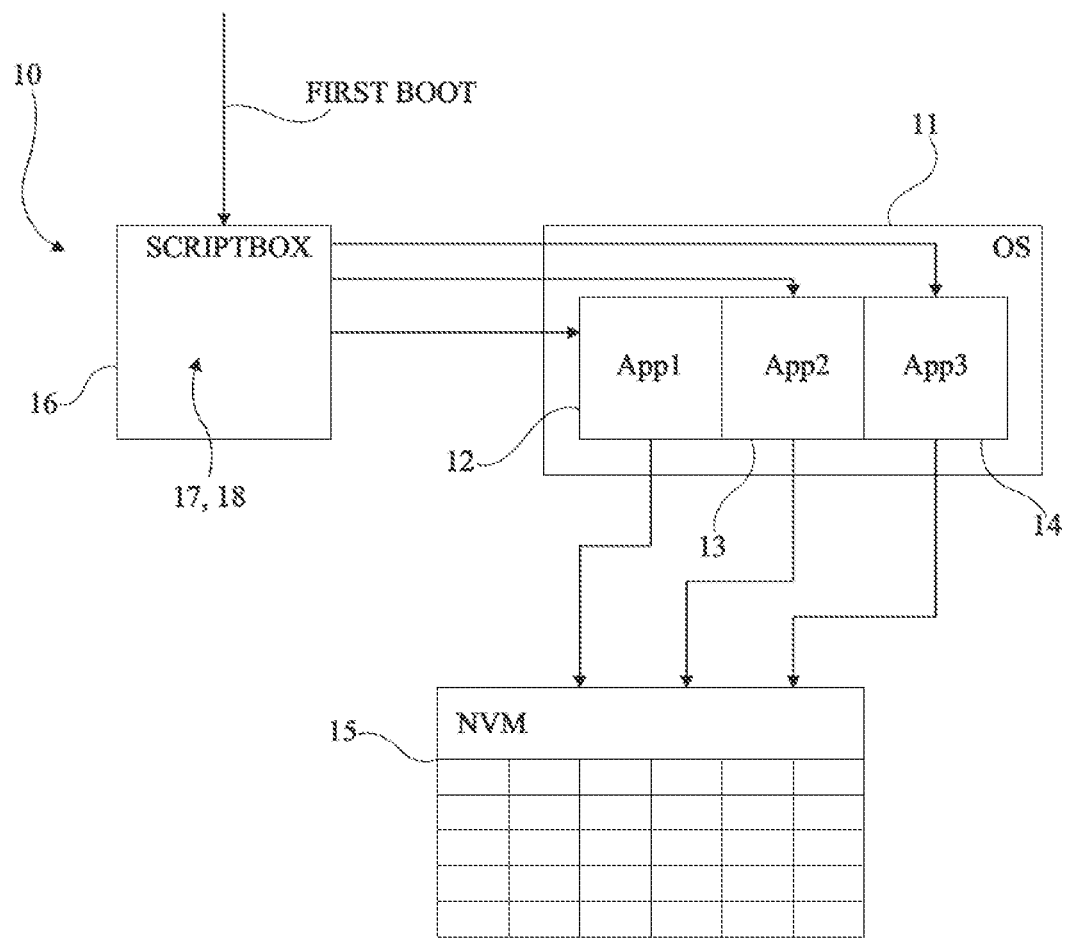
FIG. 4 schematically illustrates in the form of functional blocks the implementation mode of the method of FIG. 3.

FIG. 4 schematically illustrates in the form of functional blocks the implementation mode of the method of FIG. 3.

It is assumed that area 16 (SCRIPTBOX) contains the instructions and data of a plurality of applications, for example three applications which have been stored therein at the end of the manufacturing. However, the process illustrated in FIGS. 3 and 4 may be implemented for systems only implementing a single application.

FIG. 4 illustrates the three elements or functions of embedded system 10 which are involved in the configuration or personalization of application(s) by the implementation of the method of FIG. 3. It comprises non-volatile memory 15 and, more particularly, its area (152, FIG. 2) intended to store the applications (the instructions and all or part of the data). It also comprises interpreter 18 of instructions 17 and operating system 11 (OS).

It is assumed that the implementation of the method of FIG. 3 results in storing into the non-volatile memory three applications 12 (App1), 13 (App2), and 14 (App3) having all or part of their configuration data stored, during the pre-personalization, into instruction area or register 16.

As an example, the data are application configuration data 17. According to an embodiment, the applications store data into the same non-volatile memory, for example, all their data are stored in the same non-volatile memory. The applications are capable of generating addresses at which their data should be read from and/or written into memory 15. Each application is more particularly capable of generating addresses at which its own data and instructions should be stored in memory 15 without encroaching upon the addresses used by the other applications. In particular, the addresses of storage of secret data such as, for example, cipher keys, are not contained in, nor known by, area 16.

At the first starting and/or configuration (FIRST BOOT) of embedded system 10, the instructions (that is, the program) stored in area 16 are executed. Such an execution results in configuring applications 12, 13, and 14 in memory 15. This phase is implemented by operating system 11, which receives and executes the instructions of area 16. The application configuration or personalization instructions in some embodiments do not contain all the instructions of the applications, but rather instructions enabling to store, into the non-volatile memory, secret data such as identifiers and passwords, etc. As a variation, area 16 stores all the instructions intended for the applications, and then distributes them to said applications so that they execute them.

An advantage of this embodiment is that, since the addresses are generated by the actual applications, the instructions stored in area or register 16 at the end of the manufacturing (step 31) need not contain explicit addresses. This avoids having to provide, at the level of the operating system, secure instructions for the personalization to guarantee that the applications are not stored at the same addresses for all the circuits or for the personalization of keys. This simplifies the pre-personalization performed at the end of the system manufacturing. Indeed, the instructions and data of the applications stored in area 16 may now be the same for all the manufactured circuits.

In other words, the storage of the application(s) into the non-volatile memory of each manufactured circuit is organized by instructions contained in dedicated area 16 and the instructions are common to all the manufactured circuits.

Once the first starting has been performed, instruction area 16 is no longer used for the configuration of the applications which are now in memory 15. It may either be used to implement the application reconfiguration method which is described hereafter, or no longer be used.

In an embodiment where instruction interpreter 18 is only used during the personalization phase, non-volatile memory area 16 in some embodiments contains both interpreter 18 and the data or instructions 17 to be interpreted. It can then be considered that instructions 17 and the instructions 18 of the interpreter are a same set of instructions. This enables, once the personalization has been performed, to free area 16 for the storage of other application data.

Figure 5:
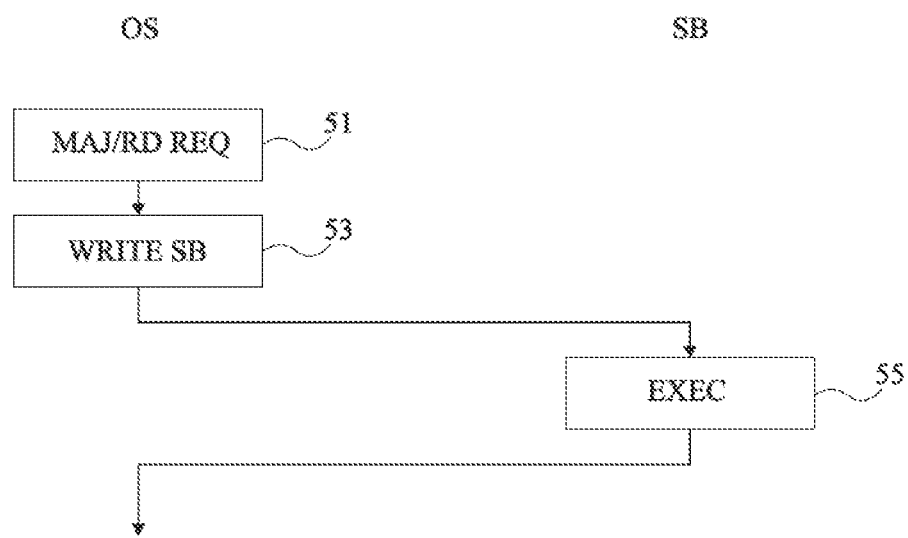
FIG. 5 very schematically shows in the form of blocks an implementation mode of a method of managing a memory circuit such as illustrated in FIG. 2.

FIG. 5 very schematically shows in the form of blocks an implementation mode of a method of managing a memory circuit such as illustrated in FIG. 2.

This method uses data interpretation program 18, contained in instruction area 16, to execute an update of one or a plurality of applications in non-volatile memory 15.

Typically, when an application stored in memory 15 should be updated (block 51, MAJ/RD REQ), operating system OS receives an update instruction from the outside.

On reception of this instruction, the operating system causes the writing into area 16 (block 53, WRITE SB) of the application to be updated (of the instructions and/or data 17 of this application).

Then, the execution (block 55, EXEC) of the program 18 contained in area 16 (SB) causes the configuration or update of the corresponding application in memory 15.

Once this execution has ended, the application is up to date.

The same process as described hereabove may be implemented for the extraction (the reading) of data of the application from memory 15.

Figure 6:
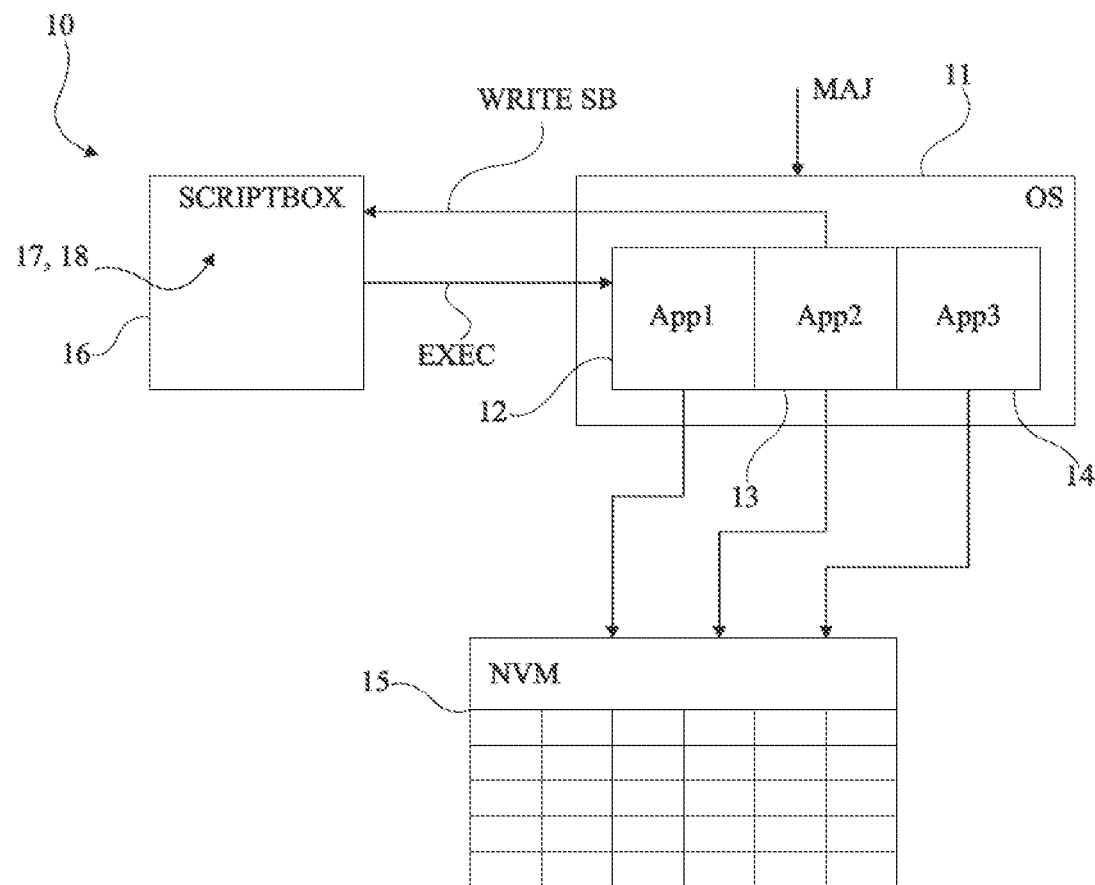
FIG. 6 schematically shows in the form of functional blocks the embodiment of the method of FIG. 5.

FIG. 6 schematically illustrates in the form of functional blocks the implementation mode of the method of FIG. 5.

FIG. 6 illustrates, as in FIG. 4, the three elements or functions of embedded system 10 which are involved in the update of application(s) by the implementation of the method of FIG. 5. It comprises non-volatile memory 15 and, more particularly, its area (152, FIG. 2) intended to store the applications (the instructions and all or part of the data). It also comprises interpreter 18 of instructions 17 and operating system 11 (OS).

It is assumed that three applications 12 (App1), 13 (App2), and 14 (App3) are present in non-volatile memory 15.

On reception of an update program (MAJ), the operating system transfers (WRITE SB) the corresponding instructions 17 into area or register 16. The interpretation program 18 contained in area 16 executes EXEC instructions 17, which results in reconfiguring or updating the concerned application(s) 12, 13, and 14 in memory 15. This phase is implemented by operating system 11, which receives and executes the instructions of area or register 16. As for the embodiment of FIGS. 3 and 4, the application configuration and/or personalization instructions do not necessarily contain all the instructions of the applications, but rather instructions enabling to store, into the non-volatile memory, among others secret data such as identifiers or passwords, etc. More particularly, assuming that interpreter 18 is used both for the initial configuration and for a data sharing between a plurality of applications, the data contained in area 16 and shared between the applications may be different from the configuration data initially used for the configuration of the applications.

Like for the embodiment of FIGS. 3 and 4, the applications store data into the same non-volatile memory, for example, all their data are stored in the same non-volatile memory. The applications are capable of generating the addresses at which their data should be read and/or written in memory 15. Each application is more particularly capable of generating addresses without encroaching upon the addresses used by the other applications Further, two identical embedded systems 10 will see the data of their applications stored at different addresses.

The solution described in relation with FIGS. 5 and 6 may also be used for the reading or the writing of data of one application by another application. For example, it is assumed that the application of block 13 (App2) requires the reading from and/or the rewriting of data into the application (App1) of block 12. For this purpose, the application of block 13 sends an instruction representative of this request to instruction area 16. This area then distributes said instruction to the application of block 12 so that it executes it. Indeed, only application 12 is capable of reading or modifying the data that it has stored in memory 15. Instruction area or register 16 thus enables to connect the different applications without it being necessary for the operating system to secure the reading or the writing.

As a variation, data and/or instructions 17 are not stored in area 16 but transit through the volatile memory, area 16 being used to store program 18 of interpretation of instructions used for the data and/or instruction transfer.

An advantage of this embodiment is that it allows the reading and/or the rewriting of data of an application by another one, without for the applications to share the addresses at which said data are stored.

Various embodiments and variants have been described. Those skilled in the art will understand that certain features of these embodiments can be combined and other variants will readily occur to those skilled in the art. In particular, the embodiments of FIGS. 1 and 2 are compatible, the control register or area being capable of cumulating the two uses described in FIG. 1 and in FIG. 2.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
responding, by an operating system of an embedded system having a microprocessor and a non-volatile memory, to a request to update an application stored in a first area of the non-volatile memory by writing instructions associated with the update into a second area of the non-volatile memory, wherein the instructions associated with the update are instructions of personalization; and
updating, by an interpreter of the non-volatile memory separate from the operating system, the application stored in the first area of the non-volatile memory based on the instructions stored in the second area of the non-volatile memory, the updating including executing, by the interpreter of the non-volatile memory, the instructions stored in second area of the non-volatile memory.

2. The method according to claim 1, wherein the application is one of a plurality of applications stored in the first area of the non-volatile memory.

3. The method according to claim 1, wherein the personalization instructions associated with the update are instructions of configuration of the at least one application.

4. The method according to claim 1, wherein the application is configured to generate addresses at which data are stored in the non-volatile memory.

5. An embedded system, comprising:
a microprocessor, which, in operation, executes an operating system and an application separate from the operating system; and
a non-volatile memory coupled to the microprocessor and including:
a first storage area, which, in operation, stores the application;
a second storage area, which, in operation, stores update information associated with the application; and
an interpreter, distinct from the operating system, which, in operation, updates the application stored in the first storage area based on the update information stored in the second storage area, wherein the updating the application comprises executing instructions of personalization of the application.

6. The embedded system according to claim 5, wherein the first storage area stores a plurality of applications executable by the microprocessor.

7. The embedded system according to claim 5, wherein the personalization instructions comprise instructions of configuration of the application.

8. The embedded system according to claim 7, wherein the application is configured to generate addresses at which the application stores data in the memory.

9. The embedded system according to claim 5, wherein the application is a bank payment or transport application.

10. A chip card, comprising:
- a microprocessor, which, in operation, executes an operating system and an application separate from the operating system; and
- a non-volatile memory coupled to the microprocessor and including:
  - a first storage area, which, in operation, stores the application;
  - a second storage area, which, in operation, stores update information associated with the application; and
  - an interpreter distinct from the operating system, which, in operation, updates the application stored in the first storage area based on the update information stored in the second storage area, wherein the updating the application includes executing instructions of personalization of the application.

11. The chip card according to claim 10, the first storage area stores a plurality of applications.

12. The chip card according to claim 10, wherein the personalization instructions comprise instructions of configuration of the application.

13. The chip card according to claim 10, wherein the application is configured to generate addresses at which data associated with the application is stored in the non-volatile memory.

14. The chip card according to claim 10, wherein the application is a bank payment or transport application.

* * * * *